United States Patent
Arnold et al.

[11] Patent Number: 5,647,763
[45] Date of Patent: Jul. 15, 1997

[54] MULTI-MEDIA CROSS CONNECT SYSTEM

[75] Inventors: Richard W. Arnold, Clermont, Fla.; Richard E. Woodrum, Louisville, Ky.

[73] Assignee: Superior Modular Products Incorporated, Swannanoa, N.C.

[21] Appl. No.: 732,210

[22] Filed: Oct. 16, 1996

Related U.S. Application Data

[63] Continuation of Ser. No. 385,905, Feb. 9, 1995, abandoned.

[51] Int. Cl.$^6$ .................................................. H01R 13/74
[52] U.S. Cl. ........................... 439/540.1; 439/532
[58] Field of Search .................... 439/540.1, 532

[56] References Cited

U.S. PATENT DOCUMENTS

| | | | |
|---|---|---|---|
| 4,712,232 | 12/1987 | Rodgers | 439/532 |
| 4,767,338 | 8/1988 | Dennis et al. | 439/532 |
| 4,773,867 | 9/1988 | Keller et al. | 439/532 |
| 4,909,757 | 3/1990 | Reed | 439/532 |
| 5,035,645 | 7/1991 | Siemon et al. | 439/532 |
| 5,125,852 | 6/1992 | Archer | 439/555 |
| 5,161,997 | 11/1992 | Defibaugh et al. | 439/540.1 |
| 5,366,388 | 11/1994 | Freeman et al. | 439/540.1 |

OTHER PUBLICATIONS

Product information sheet, "Cross Connect Blocks", catalog Nos. 5811089A, 5811089I, 24811089A, 24811089I, 25811089A, 25811089I, BR258066A, BR256066A, Hubbell Premise Wiring, Inc., 14 Lord's Hill Rd., Stonington, CT 06378–0901 (1.94).

Primary Examiner—Gary F. Paumen
Attorney, Agent, or Firm—Carter & Schnedler

[57] ABSTRACT

A multi-media cross-connect facility which employs an industry-standard "Type 89" bracket as a mounting base. A support for a set of connection devices, such as snap-in modular jacks, fiber optic cable coupler adapters and coaxial cable coupler adapters, takes the form of an elongated rectangular panel. The panel is formed of sheet metal having a thickness of 1/16 inch, with the edges rolled to define hems resulting in 1/8 inch thick mounting regions along the sides. The 1/16 inch thick intermediate region has apertures for receiving snap-in connection devices, while the 1/8 inch thick mounting regions, which are also provided with notches, are properly received by the "Type 89" bracket.

14 Claims, 6 Drawing Sheets

MULTI-MEDIA CROSS CONNECT SYSTEM

CROSS-REFERENCE TO RELATED APPLICATION

This is a continuation of application Ser. No. 08/385,905, filed Feb. 9, 1995, and now abandoned.

BACKGROUND OF THE INVENTION

The present invention relates generally to cross-connect facilities including modular jacks and, more particularly, to a cross-connect facility suitable for multi-media applications (twisted pair-to-modular, fiber optic cable and coaxial cable) and compatible with the industry standard type 89B and 89D brackets.

Modular electrical connector products for the telecommunications industry, particularly plugs and jacks, have achieved wide acceptance. Plugs and jacks are generally intermatable because the inside dimensions of the jack and the outside dimensions of the plug are in accordance with U.S. Federal Government-mandated standards under Part 68 of the regulations of the Federal Communications Commission.

In one mounting system, a plurality of modular jacks are soldered to a printed circuit board (PCB) of appropriate size, and the PCB in turn includes appropriate connectors for cabling, these connectors being electrically connected to the jacks themselves by means of conductor traces on the PCB. Such PCBs with modular jacks attached may be mounted in various panel configurations, such as rack-mount panels where the printed circuit board is mounted to the panel by means of stand-off posts, such that the ends of the modular jacks are in alignment with apertures in the panel, and generally flush with the front face of the panel. The connections may include insulation displacement connectors (IDC connectors) which accommodate solid or stranded conductors providing a punch-down capability for cables.

In another mounting system, jacks are mounted to a panel such as a well-mounted face plate or to a panel secured to an underlying support by means of stand off posts. As is disclosed for example in Archer U.S. Pat. No. 5,125,852 entitled "Universal Electrical Connector Jack," to avoid the use of mounting hardware such as screws, snap-in jacks have been developed which snap into standardized cutouts in a face plate or panel. Such snap-in jacks are positively locked into place by means of post projections on a small cover plate associated with each individual jack, the post projections on the removable cover plate preventing movement of flexible members which implement the snap-in feature of the jack. The cover plate also enhances the cosmetic appearance of the assembly.

While the jack of Archer U.S. Pat. No. 5,125,852 is capable of accommodating a range of wallplate or panel thicknesses, nevertheless a standardized wallplate or panel thickness is 1/16 inch, and accordingly many many snap-in jacks are designed to accommodate a 1/16 panel thickness.

Such snap-in jacks on their rear side typically include insulation displacement connectors (IDC connectors) which accommodate solid or stranded conductors, providing a direct "punch-down" connection for all cables, with a stuffer cap for final termination and to mechanically secure the assembly.

An advantage of the use of snap-in jacks is that various other connectors and adapters, other than modular jacks, can be designed to snap-in to the same faceplate or panel openings, thus increasing the versatility of the resultant system. Such multi-application, multi-media adapters include ST couplers for fiber optic applications, and BNC couplers and F-type couplers for coaxial cable applications.

Relevant in the context of the present invention is what is known as a type 89D or a type 89B bracket, which is a telephone industry standard. An "89" bracket is designed to receive what is known in the telephone industry as a "66 type" block or set of insulation displacement cross-connect fields. The "66 Type" insulation displacement cross-connect blocks normally support fifty rows of IDC punch-down connectors, each row having a pair of two-connector sets, with the two connectors of each set being electrically connected whereby a convenient electrical connection may be made between two wires. The "66 type" insulation displacement cross-connect field blocks have a generally flat rear surface which contacts rectangular spacer posts which are part of the "type 89" bracket, such that a wire trough or guideway is defined between the rear surface of the "66 type" block and the rear of the "type 89" bracket itself. The "66 type" connection block traditionally has a 1/8 inch thick mounting flange, and the "type 89" bracket includes "snap-on retaining members" designed to secure the "66 type" connection block by this mounting flange. "89" Brackets and "66" type" are ubiquitous and nearly universally used in telephone equipment closets of all typing ranging from simple multi-line telephone systems in small offices to large private branch exchange (PBX) installations.

Also relevant in the context of the present invention is a cross-connect, available from Hubbell Premise Wiring, Inc., 14 Lord's Hill Road, Stoningt, Conn. The Hubbell cross-connect block mounted to a type 89D bracket, and provide a means for, for example, cross-connecting PBX systems and electronic key systems. Also, it may be employed for patch panel purposes.

The Hubbell cross-connect blocks typically include twelve modular jacks mounted to a printed circuit board, which also supports an appropriate number of IDC punch-down connectors electrically connected to appropriate pins on the modular jacks. While a convenient system for many applications, and advantageous in that a "89D" bracket is employed as the mounting base, nevertheless the Hubbell cross-connect block system is subject to a number of limitations. For example, the Hubbell cross-connect block system is limited to use with modular jacks, and thus does not support fiber optic and coaxial cable applications.

SUMMARY OF THE INVENTION

Accordingly, it is an object of the invention to provide an improved cross-connect facility which can employ a "type 89" bracket as a mounting base.

It is yet another object of the invention to provide such a cross-connect facility which can support multi-media applications, and which is thus not limited to modular jack applications.

It is yet another object of the invention to provide a multi-media cross-connect facility which is effective yet highly cost-efficient.

It is yet another object of the invention to provide a multi-media cross-connect facility which is versatile in the sense that various connector types (e.g. modular, fiber optic and coaxial) can readily be mixed and matched, either at the time of initial installation, or at any time thereafter.

In accordance with the invention, there is provided a support for a set of connection devices, such as snap-in modular jacks, fiber optic cable coupler adapters and coaxial cable coupler adapters, designed for mounting within a rectangular aperture in a panel of any redetermined thickness, for example a 1/16 inch panel.

The support takes the form of an elongated rectangular panel. The panel has a pair of ends, and a pair of sides relatively longer than the ends. The panel is approximately ten inches in height, and 2 1/4 inches wide. Extending along the sides are a pair of mounting regions, and an intermediate region is defined between the mounting regions. In a preferred embodiment, the panel has a greater thickness in its mounting regions than in the intermediate region.

The intermediate region has a plurality of apertures sized for receiving individual ones of the connection devices, which advantageously are individually snapped into the apertures.

For removably securing the panel to the "type 89" bracket, there are a set of rectangular notches in the sides positioned and configured for mating with the retaining members of the mounting bracket.

While the panel may be made of any suitable material, such as plastic or metal, and may be formed employing any appropriate technique to provide the mounting regions of relatively greater thickness than the intermediate region, preferably the panel is made of sheet metal, such as aluminum, having a thickness of 1/16 inch, with the edges rolled to define hems which comprise the mounting regions, and having a resulting thickness of 1/8 inch.

Another aspect of the invention is a multi-media cross-connect system including a mounting bracket, such as a "type 89" bracket, and an elongated rectangular panel as summarized just above.

BRIEF DESCRIPTION OF THE DRAWINGS

While the novel features of the invention are set forth in particularity in the appended claims, the invention, both as to organization and content, will be better understood and appreciated, from the following detailed description taken in conjunction with the drawings, in which:

FIG. 9 is a rear perspective view of the panel of

FIGS. 2-4, with a set of five category 5; jacks in place;

DETAILED DESCRIPTION OF A PREFERRED EMBODIMENT

Figure 1:
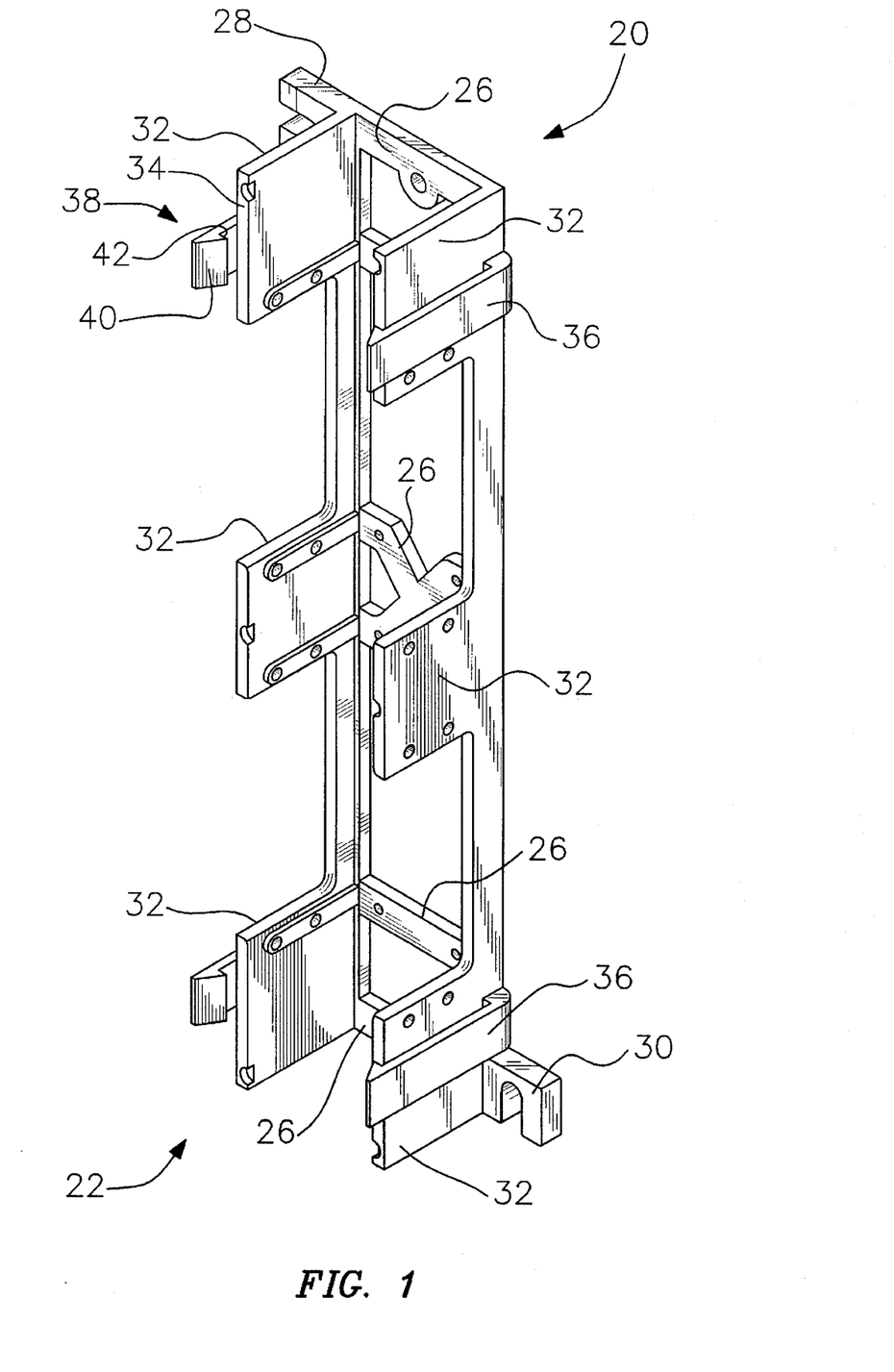
FIG. 1 is a three-dimensional view of a "type 89D" snap-on bracket.

Referring initially to FIG. 1, shown in three-dimensional form is an industry standard "type 89" bracket 20, designed to receive a "66 type" block or set of insulation displacement cross-connect fields (not shown). The bracket 20 typically comprises a single integral plastic piece, formed by injection molding, and includes left side 22 and right side 24 members which are mirror images of each other, and are interconnected by a system of structural webs 26. The bracket 20 includes a pair of mounting members 28 and 30 by which the bracket 20 is typically secured to a flat panel, such as a wood panel (not shown), in turn secured to a wall within an equipment closet.

Each of the side members 22 and 24 more particularly includes a set of three rectangular spacer posts 32 having top surfaces 34 designed to contact the underside of a "66 type" block or set of insulation cross-connect fields, and a pair of resilient retaining members 36 extending upwardly from the base of the bracket 20. For providing snap-on capability, each of the retaining members 36 has a head 38 including an inclined camming surface 40 which serves to deflect the entire head 38 when a "66 type" block is being installed, and an underside engaging surface 42, intended to engage the 1/8 inch thick mounting flange of a "66 type" block (not shown).

Figures 2, 3, 4:
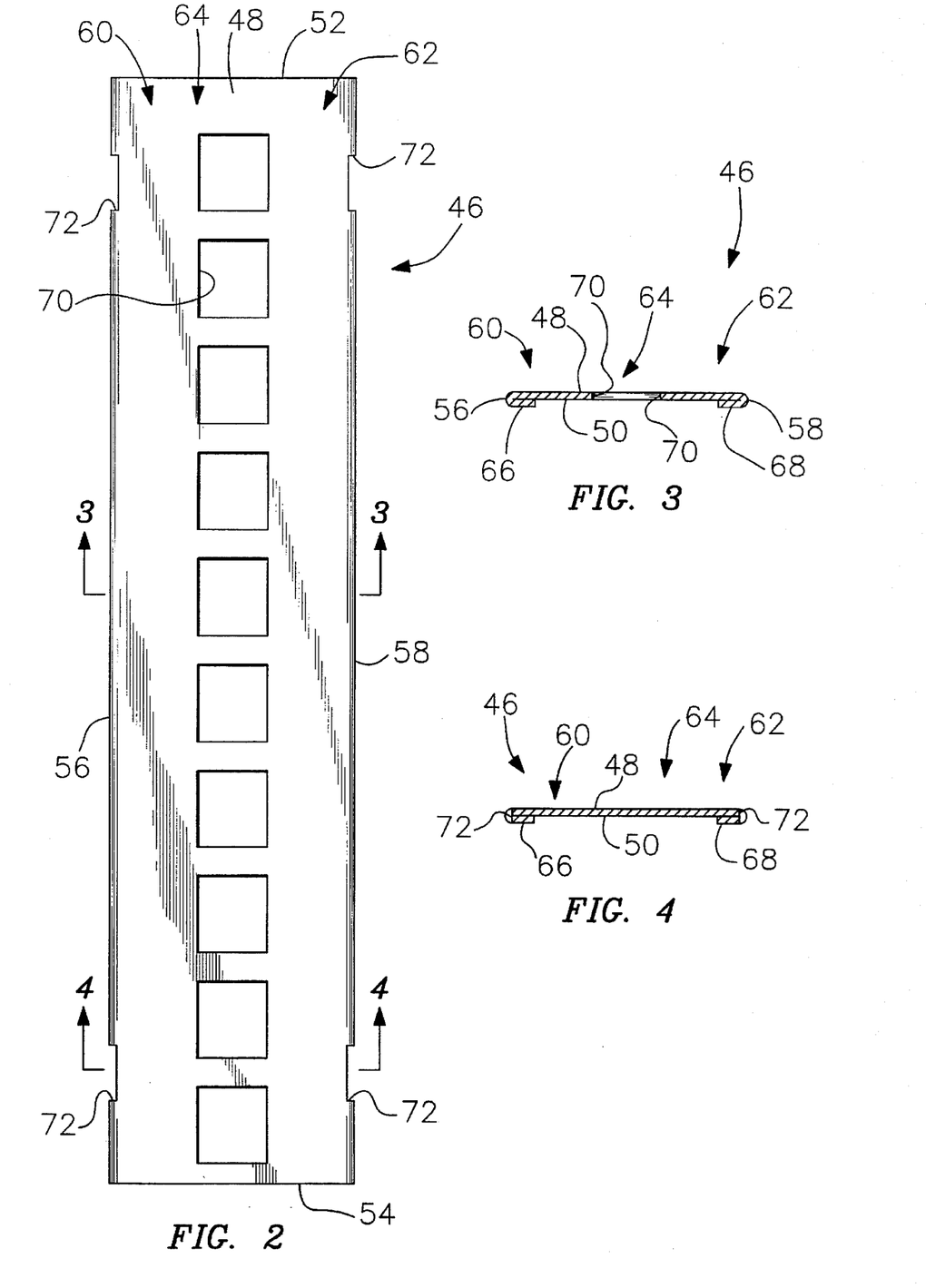
FIG. 2 is a front view of a support panel in accordance with the invention.
FIG. 3 is a section taken on line 3—3 of FIG. 2.
FIG. 4 is a section taken on line 4—4 of FIG. 2.

With reference now to FIGS. 2-4, a support in accordance with the invention takes the form of an elongated rectangular panel 46 formed of sheet aluminum, with a front surface 48 and a rear surface 50. The panel 46 has a pair of upper and lower ends 52 and 54 and a pair of left and right sides 56 and 58 relatively longer than the ends 52 and 54. Extending respectively along the sides 56 and 58 are a corresponding pair of mounting regions 60 and 62, and an intermediate region 64 is defined between the mounting regions 60 and 62.

The intermediate region 64 more particularly has a thickness of 1/16 inch, compatible with snap-in modular connectors of the type referred to hereinabove, and the mounting regions 60 and 62 have a thickness of 1/8 inch, consistent with the retaining members 36 on the FIG. 1 type 89 bracket 20.

This preferably is achieved by bending the edges of the metal panel 46 such that the edges 56 and 58 are rolled edges, and hems 66 and 68 are defined. This hem arrangement thus advantageously provides beneficial stiffness to the assembly, the correct thickness (1/8 inch) for mounting to the 89D bracket, and yet is thin enough in the intermediate region 64 for jacks and adapters which expect a thinner panel (e.g. 1/16 inch) to snap in properly.

The intermediate region 64 includes a plurality of apertures 70, in a standard size of 0.685 inch high and 0.625 inch wide, for receiving the connection devices, which thus are accommodated by the 1/16 inch panel thickness at that point. In addition, there is a set of rectangular notches 72 in the sides 56 and 58 positioned and configured for mating with the retaining members 36 of the FIG. 1 bracket 20, for removably securing the panel 46 to the bracket 20.

Figure 5:
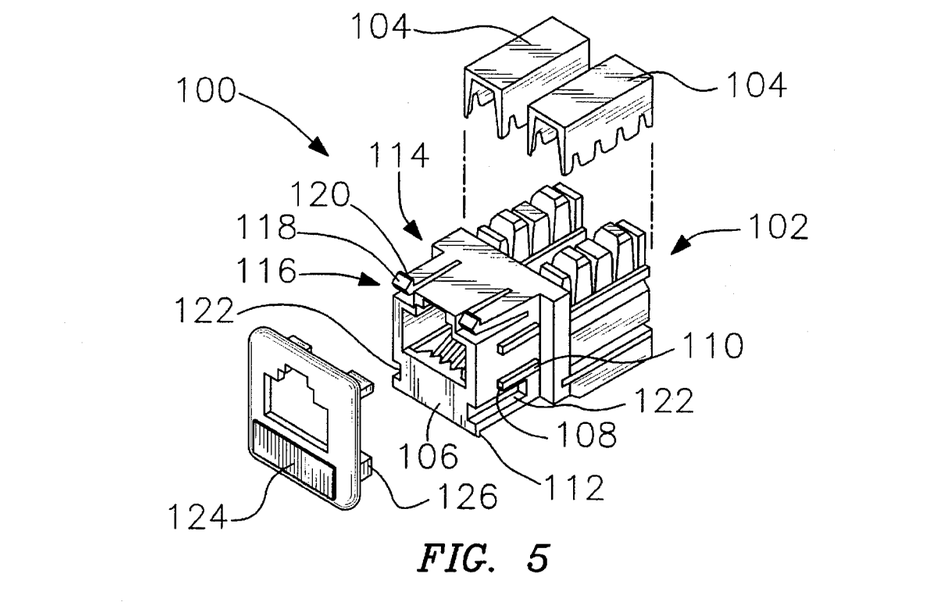
FIG. 5 is an exploded view of a typical Category 5 universal modular jack intended for snap-in mounting within a rectangular aperture in a face plate or panel.

FIG. 5 is an exploded view of a typical category 5 universal modular jack (UMJV) 100 intended for snap-in mounting within a 0.685 inch by 0.625 inch rectangular opening in a 1/16 inch thick wall plate or panel, as is briefly described hereinabove.

The FIG. 5 jack 100 includes a set of IDC connectors 102 which accommodate solid or stranded conductors, providing a direct punch-down for all cables, and a pair of stuffer caps 104 for final termination.

The jack 100 has a front body 106 which, in use, extends into the panel aperture, forward movement being limited by ends 108 of a set of projections 110 integrally molded with the body 106. To secure the jack 110 within a panel opening, at the lower end of the jack 100 is a lip 112, and at the upper end are a pair of resilient snap-on retaining members 114, each including a head 116 having an inclined camming surface 118, and a rear engagement surface 120. It will be appreciated that, upon installation into a panel, the retaining members 114 momentarily deflect by action of the camming surfaces 118, and the engagement surfaces 120 engage the front of the particular panel.

Clearance spaces 122 are provided to accommodate this movement of the retaining members 114. For cosmetic purposes, and also to positively lock the jack 110 in position within a panel, a small face plate 124 is provided, having post projections 126 which fit within the space 122.

Figures 6, 7:
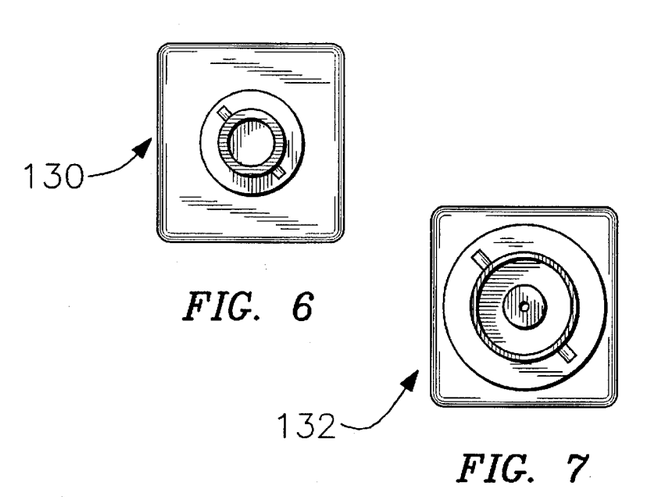
FIG. 6 is a representation of an ST coupler for a fiber optic cable, and sized for snap-in mounting within the same opening as the FIG. 5 modular jack.
FIG. 7 is a similar representation of a BNC coupler for a coaxial cable.
Figure 8:
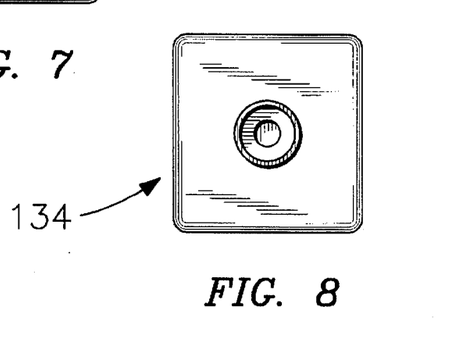
FIG. 8 is a similar representation of an F type coupler for a coaxial cable.

In accordance with the multi-media aspect of the invention, FIG. 6 depicts an ST coupler or adapter 130 for fiber optic applications, FIG. 7 depicts a BNC coupler or adapter 132 for coaxial cable applications, and FIG. 8 depicts an F coupler or adapter 134, also for coaxial cable applications. Each of the couplers or adapters of FIGS. 6, 7 and 8 is sized and configured for mounting within the same panel opening as the jack 100, for convenient mix and match capability.

Figure 9:
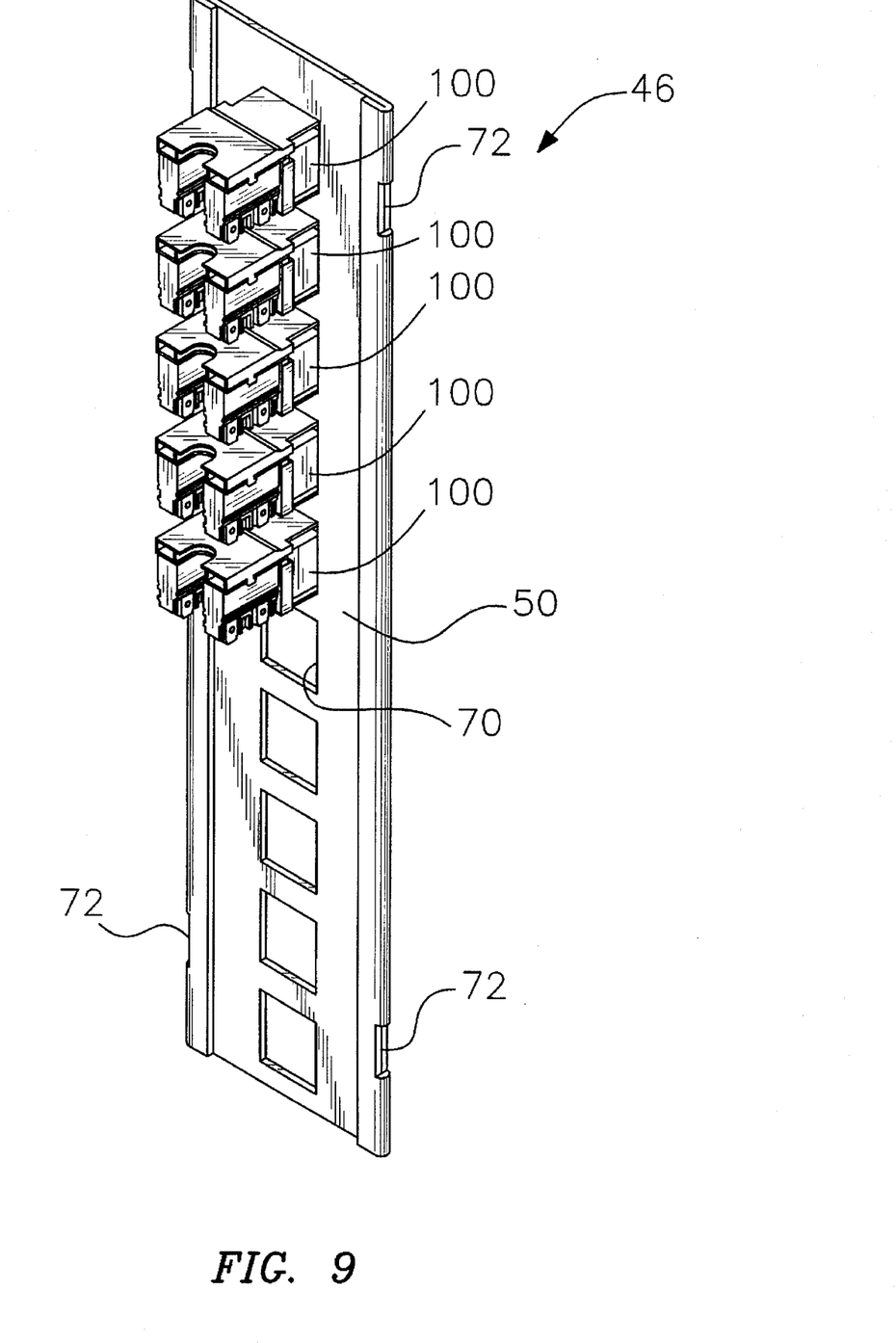

With reference now to FIG. 9, shown is a rear view of the panel 46 of FIG. 2, with five Category 5 jacks, such as the jack 100 of FIG. 1, secured within the upper five apertures 70. The lower five apertures, in this particular illustration, are unused, for purposes of illustration. Also for purposes of illustration, only category 5 jacks are shown within the panel apertures 70. However, it will be appreciated that any of the couplers or adapters 130, 132 or 134 of FIGS. 6, 7 and 8 may be employed as well. Since each of these jacks or couplers stands on its own, without being mounted to a common printed circuit board, it will be appreciated that they may readily and arbitrarily be mixed and matched, either upon initial installation or subsequently.

Figure 10:
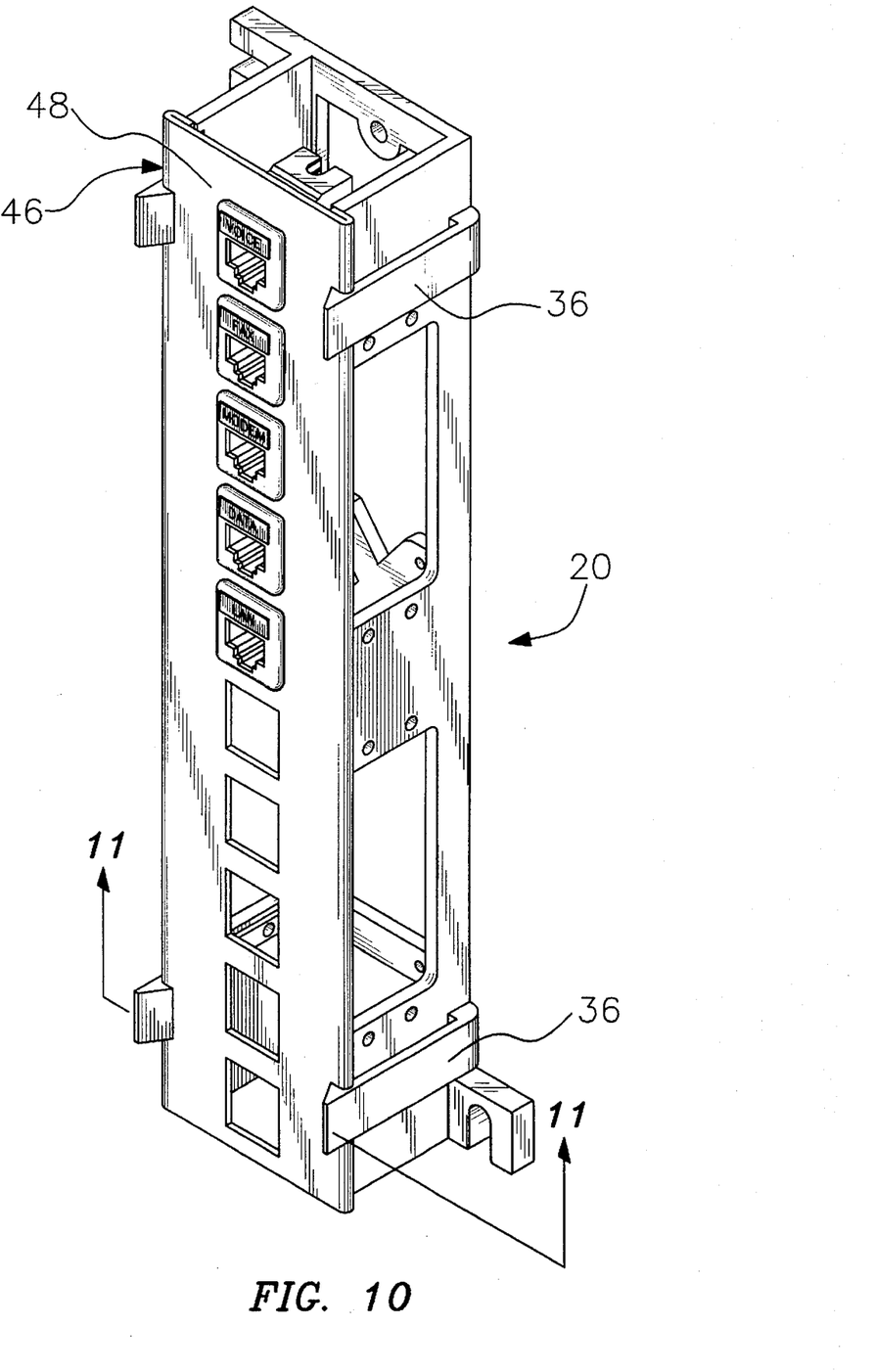
FIG. 10 is a three-dimensional view of the front of the panel of FIG. 9, secured to the "type 89" bracket of FIG. 1.
Figure 11:
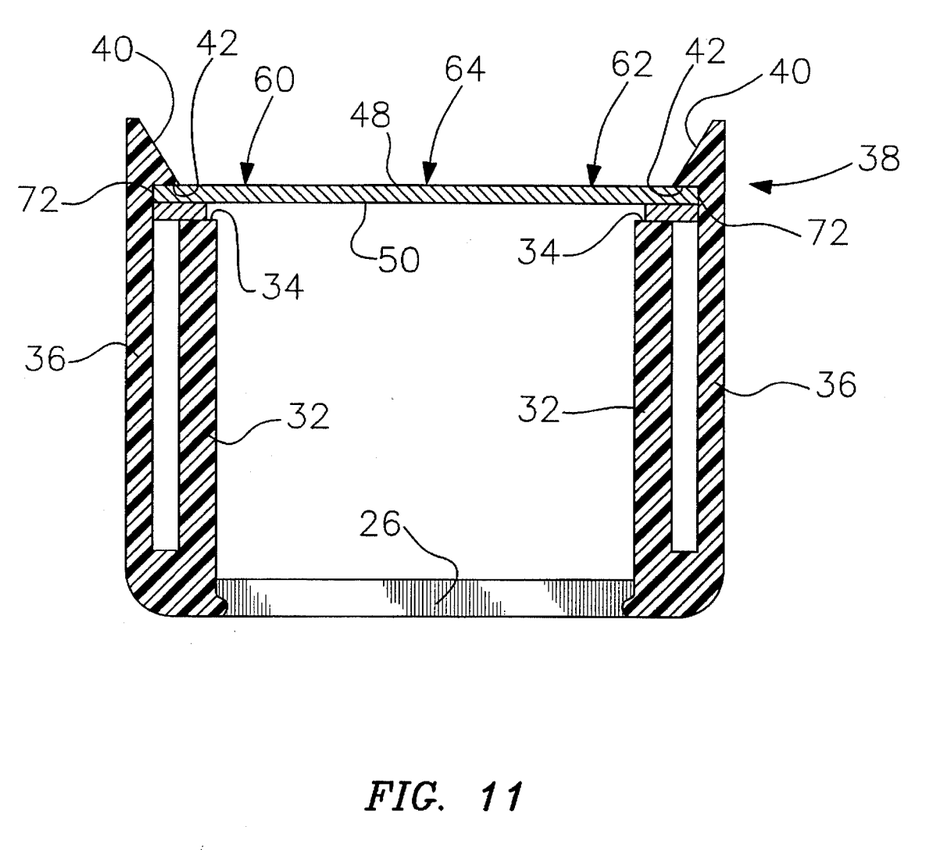
FIG. 11 is a section taken on line 11—11 of FIG. 10.

Referring finally to FIGS. 10 and 11, the invention is shown in assembled form, with the panel 46 carrying a plurality of modular jacks being secured to the type 89D bracket 20.

As is best seen in FIG. 11, the rear surface 50 of the panel 46, particularly in the mounting regions 60 and 62 thereof, bears against the upper surface 34 of each of the rectangular support posts 32 of the bracket 20. At the same time, the front surface 48 of the panel 46, in particular within the mounting region 60 and 64, is engaged by the engagement surface 42 of the heads 38, the heads 38 having been pushed laterally during installation by operation of the camming surface 40 within the notches 70.

While in the illustrated embodiment the panel 46 has a plurality of identical apertures 70, it will be appreciated that various different size apertures may be provided, including round apertures, to support any desired forms of connectors, with perhaps some loss of versatility.

Further, while preferably the panel 46 is thicker in the mounting regions 60 and 62 than in the intermediate region 64, as an alternative the panel 46 may be uniformly thick, with appropriate connection devices provided.

While specific embodiments of the invention have been illustrated and described herein, it is realized that numerous modifications and changes will occur to those skilled in the art. It is therefore to be understood that the appended claims are intended to cover all such modifications and changes as fall within the true spirit and scope of the invention.

What is claimed is:

1. Cross-connect apparatus comprising:

a set of snap-in connection devices having retaining members; and an elongated rectangular panel having a pair of ends, a pair of sides relatively longer than said ends, a pair of mounting regions extending respectively along substantially the entire length of said sides, and an intermediate region between said mounting regions, said panel having a greater thickness in said mounting regions than in said intermediate region;

said intermediate region having a plurality of apertures sized for receiving and retaining corresponding individual ones of said connection devices, said connection devices being received in corresponding ones of the apertures and retained engagement of said retaining members with said panel; and said panel having a set of rectangular notches in said sides positioned and configured for mating with retaining members of a mounting bracket for removably securing said panel to the mounting bracket.

2. The apparatus of claim 1, wherein said panel comprises metal and said mounting regions comprise hems formed with rolled edges.

3. The apparatus of claim 2, wherein said panel is formed of sheet metal having a thickness of $\frac{1}{16}$ inch, whereby said intermediate region has a thickness of $\frac{1}{16}$ inch and said mounting regions each have a thickness of $\frac{1}{8}$ inch.

4. The apparatus of claim 1, wherein the apertures are sized for receiving connection devices selected from the set consisting of modular jacks, fiber optic coupler adapters, and coaxial cable coupler adapters.

5. The apparatus of claim 1, wherein the apertures are sized for receiving snap-in connection devices selected from the set consisting of Category 3 modular jacks, Category 5 modular jacks, ST fiber optic couplers, BNC coaxial cable couplers, and F coaxial cable couplers.

6. The apparatus of claim 1, wherein said elongated rectangular panel including said set of rectangular notches is configured for mounting to a "Type 89D" snap-on bracket designed to receive a "66 type" set of insulation displacement cross connect fields.

7. The apparatus of claim 1, wherein said elongated rectangular panel including said set of rectangular notches is configured for mounting to a "Type 89B" snap-on bracket designed to receive a "66 type" set of insulation displacement cross connect fields.

8. A versatile multi-media cross-connect system comprising:

a mounting bracket having retaining members;

a set of snap-in connection devices; and a support for said set of connection devices, said support being secured to said mounting bracket, and including an elongated rectangular panel having a pair of ends, a pair of sides relatively longer than said ends, a pair of mounting regions extending respectively along substantially the entire length of said sides, and an intermediate region between said mounting regions, said panel having a greater thickness in said mounting regions than in said intermediate region;

said intermediate region having a plurality of apertures sized for receiving and retaining corresponding individual ones of the connection devices, said connection devices being received in corresponding ones of the apertures and retained by engagement with said panel; and a set of rectangular notches in said sides positioned and configured for mating with said retaining members of said mounting bracket, said panel being secured to said mounting bracket by said retaining members.

9. The cross-connect system of claim 8, wherein said mounting bracket comprises a "Type 89D" snap-on bracket designed to receive a "66 type" set of insulation displacement cross-connect fields.

10. The cross-connect system of claim 8, wherein said mounting bracket comprises a "Type 89B" snap-on bracket designed to receive a "66 type" set of insulation displacement cross-connect fields.

11. The cross-connect system of claim 8, wherein said panel comprises metal and said mounting regions comprise hems formed with rolled edges.

12. The cross-connect system of claim 11, wherein said panel is formed of sheet metal having a thickness of 1/16 inch, whereby said intermediate region has a thickness of 1/16 inch and said mounting regions each have a thickness of 1/8 inch.

13. The cross-connect system of claim 8, wherein the apertures are sized for receiving connection devices selected from the set consisting of modular jacks, fiber optic coupler adapters, and coaxial cable coupler adapters.

14. The cross-connect system of claim 8, wherein the apertures are sized for receiving snap-in connection devices selected from the set consisting of Category 3 modular jacks, Category 5 modular jacks, ST fiber optic couplers, BNC coaxial cable couplers, and F coaxial cable couplers.

* * * * *